(12) United States Patent
Kimelman

(10) Patent No.: US 8,607,035 B2
(45) Date of Patent: Dec. 10, 2013

(54) MULTI-CORE PROCESSING UTILIZING PRIORITIZED INTERRUPTS FOR OPTIMIZATION

(75) Inventor: Paul Kimelman, Alamo, CA (US)

(73) Assignee: Texas Instruments Incorporated, Dallas, TX (US)

(*) Notice: Subject to any disclaimer, the term of this patent is extended or adjusted under 35 U.S.C. 154(b) by 948 days.

(21) Appl. No.: 12/550,951

(22) Filed: Aug. 31, 2009

(65) Prior Publication Data
US 2010/0174886 A1 Jul. 8, 2010

Related U.S. Application Data

(60) Provisional application No. 61/092,958, filed on Aug. 29, 2008.

(51) Int. Cl.
*G06F 9/00* (2006.01)
(52) U.S. Cl.
USPC .......................................................... 712/244

(58) Field of Classification Search
USPC ............................................................ 712/28
See application file for complete search history.

(56) References Cited

U.S. PATENT DOCUMENTS

| | | | |
|---|---|---|---|
| 5,701,495 A * | 12/1997 | Arndt et al. | 710/263 |
| 7,552,236 B2 * | 6/2009 | Greenfield et al. | 709/238 |
| 7,685,347 B2 * | 3/2010 | Gibbs | 710/264 |
| 7,996,595 B2 * | 8/2011 | Wolfe | 710/265 |
| 2007/0038818 A1 * | 2/2007 | Greenfield et al. | 711/152 |

* cited by examiner

*Primary Examiner* — Andrew Caldwell
*Assistant Examiner* — Benjamin Geib
(74) *Attorney, Agent, or Firm* — Robert D. Marshall, Jr.; Wade James Brady, III; Frederick J. Telecky, Jr.

(57) ABSTRACT

This invention relates to multi-core, multi-processing, factory multi-core and DSP multi-core. The nature of the invention is related to more optimal uses of a multi-core system to maximize utilization of the processor cores and minimize power use. The novel and inventive steps are focused on use of interrupts and prioritized interrupts, along with optional in-built methods, to allow systems to run more efficiently and with less effort on the part of the programmer.

6 Claims, 5 Drawing Sheets

MULTI-CORE PROCESSING UTILIZING PRIORITIZED INTERRUPTS FOR OPTIMIZATION

CLAIM OF PRIORITY

This application claims priority under 35 U.S.C. 119(e)(1) to U.S. Provisional Application No. 61/092,958 filed Aug. 29, 2008.

TECHNICAL FIELD OF THE INVENTION

The present invention relates to multi-core, multi-processing, factory multi-core and DSP multi-core. More specifically, the present invention uses prioritized interrupts for optimization.

BACKGROUND OF THE INVENTION

This application addresses the problem of devoting data processing capability to a variety of user applications while providing efficient use of hardware resources and electric power. An initial response to a need for greater data processing capability is to operate the central processing unit at higher speeds. Increasing the rate of operation of a central processing unit enables greater data processing operations per unit time. This is not a complete solution because memory speed often cannot keep pace with processor speed. The mismatch of processor speed and memory speed can be minimized using memory cache, but such memory cache introduces other problems. Often high processor speeds require deep pipelining. Deep pipelining extends the processing time required to process conditional branches. Thus increased processor speed can achieve only limited improvement. Another potential response is multi-processing. The central processing unit and at least some auxiliary circuits are duplicated. Additional data processor cores enable greater data processing operations per unit time.

Moving from a uni-processor system to a multi-processor system involves numerous problems. In theory providing additional data processor cores permits additional data processing operations. However, proper programming of a multi-processor system to advantageously exploit additional data processor cores is difficult. One technique attempting to solve this problem is called symmetrical multi-processing (SMP). In symmetrical multi-processing each of the plural data processor cores is identical and operates on the same operating system and application programs. It is up to the operating system programmer to divide the data processing operations among the plural data processor cores for advantageous operation. This is not the only possible difficulty with SMP. Data processor cores in SMP may operate on data at the same memory addresses such as operating system file structures and application program data structures. Any write to memory by one data processor core may alter the data used by another data processor core. The typical response to this problem is to allow only one data processor core to access a portion of memory at one time using a technique such as spin locks and repeated polling by a data processor not currently granted access. This is liable to cause the second data processor core to stall waiting for the first data processor core to complete its access to memory. The problems with sharing memory are compounded when the identical data processor cores include caches. With caches each data processor core must snoop a memory write by any other data processor core to assure cache coherence. This process requires a lot of hardware and takes time. Adding additional data processor cores requires such additional resources that eventually no additional data processing capability is achieved by such addition.

Another multi-processing model is called the factory model. The factory model multi-processing requires the software developer to manually divide the data processing operation into plural sequential tasks. Data processing then flows from data processor core to data processor core in the task sequence. This division of the task is static and not altered during operation of the multi-processor system. This is called the factory model in analogy to a factory assembly line. This factory model tends to avoid the data collisions of the SMP model because the data processor cores are working on different aspects of the data processing operation. This model tends to work best for data flow operations such as audio or video data streaming. This factory model is often used in digital signal processing (DSP) operations which typically have many of these data flow operations. There are problems with this factory model as well. The task of dividing the data processing operation into sequential tasks is generally not simple. For even loading of the data processor cores is required to best utilize this factory model. Any uneven loading is reflected in one or more data processor cores being unproductive while waiting for data from a prior data processor core or waiting for a next data processor core to take its data output. The nature of the data processing operation may preclude even loading of the plural data processor cores. Processes programmed using the factory model do not scale well. Even small changes in the underlying data processing operation to be performed by the system may require complete re-engineering of the task division.

SUMMARY OF THE INVENTION

This invention relates to more optimal uses of a multi-core system to maximize utilization of data processor cores and minimize power use. The invention uses prioritized interrupts and optional in-built methods to allow systems to run more efficiently with less programmer effort.

BRIEF DESCRIPTION OF THE DRAWINGS

These and other aspects of this invention are illustrated in the drawings, in which.

DETAILED DESCRIPTION OF PREFERRED EMBODIMENTS

This invention is a method and apparatus for factory multi-core data processor utilizing prioritized interrupts for optimization. This application describes numerous details to provide an understanding of the present invention. One skilled in the art will appreciate that one may practice the present invention without these details. This application does not describe some well known subject matter in detail to not obscure the description of the invention.

Figure 1:
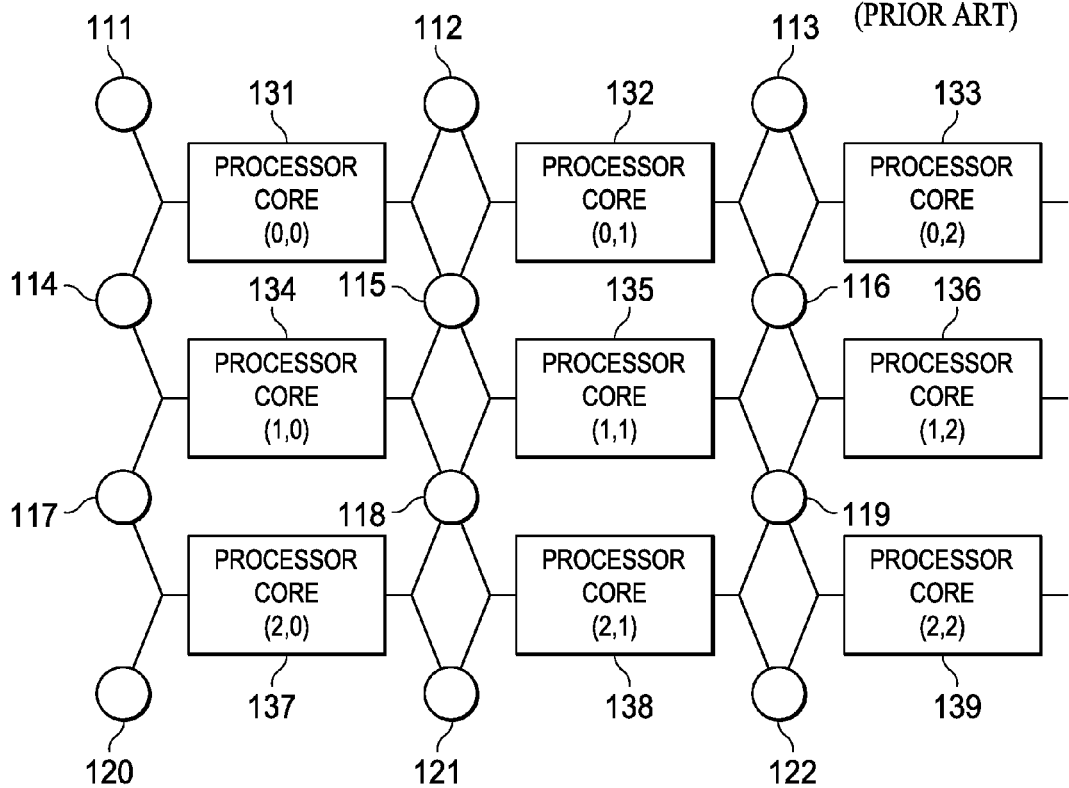
FIG. 1 shows a factory multi-core checkerboard consisting of an array of data processor cores connected to shared memory units applicable to the present invention (prior art)

This invention is a multi-core system containing plural data processor cores interconnected with memory and peripherals in a single integrated circuit. The topology may be checkerboard, hierarchical, clusters or other forms. FIG. 1 illustrates the preferred checkerboard topology. This invention uses prioritized interrupts to add value to many forms of processing. The anticipated optimal use of this invention is not symmetrical multiprocessing (SMP) in the standard meaning. This invention anticipates that memory caches within the data processor cores are sub-optimal and not envisioned.

FIG. 1 illustrates a factory multi-core checkerboard consisting of an array of data processor cores 131, 132, 133, 134, 135, 136, 137, 138 and 139 connected to shared memories 111, 112, 113, 114, 115, 116, 117, 118, 119, 120, 121 and 122. As illustrated in FIG. 1, each memory 111, 112, 113, 114, 115, 116, 117, 118, 119, 120, 121 and 122 may be accessed by up to four data processor cores 131, 132, 133, 134, 135, 136, 137, 138 and 139. For example, FIG. 1 illustrates that shared memory 115 may be accessed by data processor cores 131, 132, 134 and 135. As illustrated in FIG. 1, each data processor cores 131, 132, 133, 134, 135, 136, 137, 138 and 139 may accesses up to four memories 111, 112, 113, 114, 115, 116, 117, 118, 119, 120, 121 and 122. For example, FIG. 1 illustrates that data processor core 135 may be access memories 115, 116, 118 and 119. FIG. 1 illustrates a preferred embodiment for higher count multi-core designs that is predictable in processing time and layout. In the preferred embodiment, there are no caches and each shared memory 111, 112, 113, 114, 115, 116, 117, 118, 119, 120, 121 and 122 is a multi-port memory. Such a multi-port memory may be constructed using a memory four times faster that the data processor cores with each data processor core having one access each four memory cycles. This ensures deterministic behavior.

Figure 2:
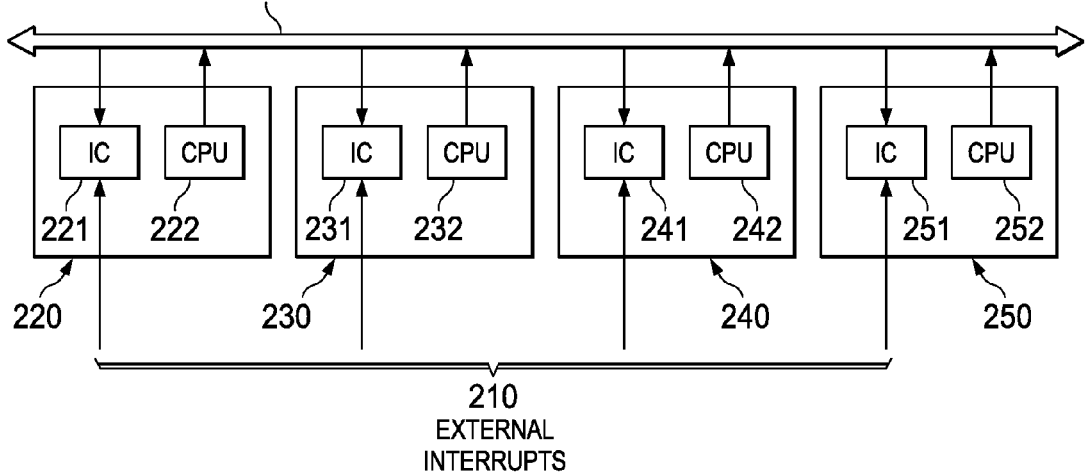
FIG. 2 shows a four data processor core cluster such that each data processor core's interrupt controller (IC) is memory mapped onto the bus and each data processor core is a master on the bus.

FIG. 2 shows an example of a four data processor core cluster. In the example of FIG. 1, each data processor core 220, 230, 240 and 250 has a corresponding interrupt controller (IC) 221, 231, 241 and 251. Each IC 221, 231, 241 and 251 has an interrupt register memory mapped onto bus 200. Each data processor core 220, 230, 240 and 250 includes a corresponding central processing unit (CPU) 222, 232, 242 and 252 that is a master on bus 200. In the preferred embodiment, triggering an interrupt via a request from software is a memory mapped operation. A write to a particular memory address corresponding to the interrupt register of an IC of the target data processor core triggers an interrupt. Software triggered interrupts may be purely by memory mapped access as described, by inter-core wiring, by an interrupt bus or some combination. External interrupts 210 are wired to corresponding IC 221, 231, 241 and 251 in the normal fashion.

In the system illustrated in FIG. 2 one data processor core many notify one or more other data processor cores via interrupt that it has completed processing. If data is to be passed, it would normally be done via pointers to shared memory. This model is valuable because interrupts are a natural aspect of any data processor architecture. This enables the following functions such as sleeping until synchronization and performing work on less important tasks until synchronization. This avoids factoring of code as is typical in DSPs. This may be flattened to all running on one data processor core where the interrupts are serviced by the single data processor core or fewer data processor cores than the maximum without modifications. This does not need special mechanisms or hardware for synchronization. This can add meaning to different software triggered interrupts enabling adding new event types cheaply.

In the preferred embodiment illustrated in FIG. 2, external interrupts are wired into the interrupt controllers from peripherals in the same manner as in typical prior art systems. Internal interrupts between data processor cores are handled by memory mapped triggering. Therefore one data processor core may interrupt another by writing to the address associated with the other data processor core's interrupt trigger register. Writing to this trigger register indicates the target data processor core and the identity of the interrupt. The routing mechanism may be wired, via an interrupt bus, via a daisy chain from one interrupt controller to the next or via a mix of such connectivity between and within cluster data processor cores and out of cluster data processor cores. In an alternative embodiment writing to the trigger register of the selected data processor core is passed by normal bus to the interrupt controller of a slave data processor core providing directed triggering. It is possible to employ both these alternates in one system.

Figure 3A:
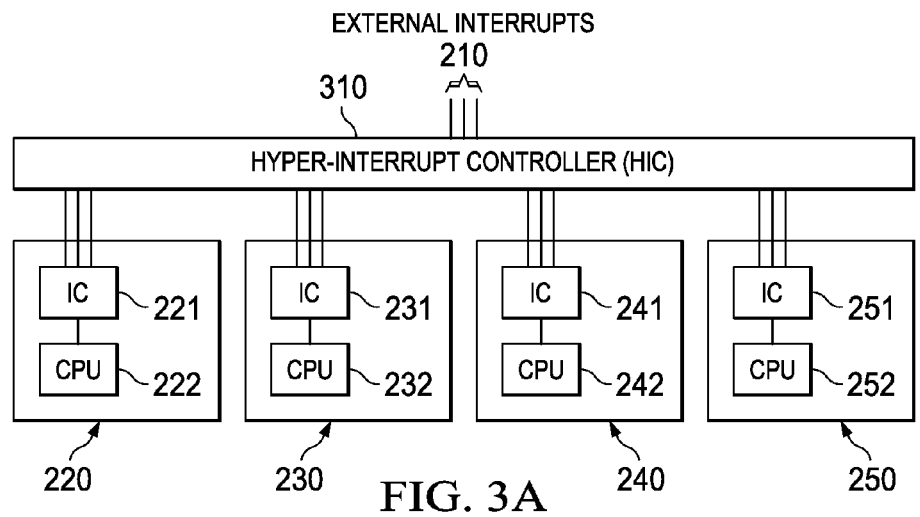
FIGS. 3A, 3B and 3C show an example load balancing system with four data processor cores which routes interrupts to a set of data processor cores in a cluster.
Figure 3B:
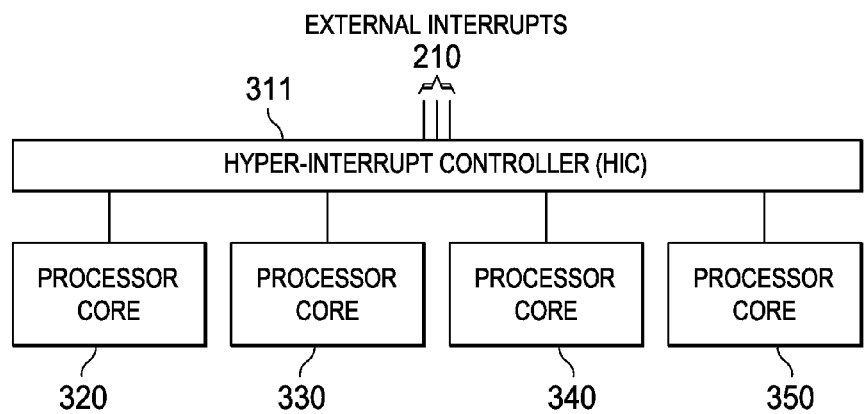
Figure 3C:
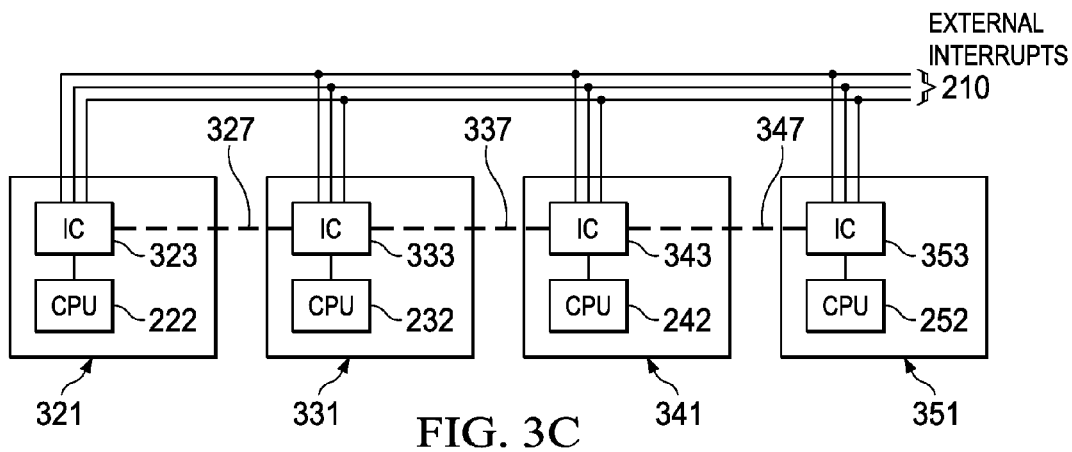

FIGS. 3A, 3B and 3C illustrate alternatives of a load balancing system which routes interrupts to a cluster of data processor cores. The example illustrated in FIGS. 3A, 3B and 3C include four data processor cores. FIG. 3A shows a hyper-interrupt controller (HIC) 310 which acts as a multiplexer to route interrupts to the appropriate data processor core 220, 230, 240 and 250. HIC 310 uses status of each data processor core to make decisions.

Hyper-interrupt controller 310 feeds interrupts to the least loaded data processor core. This decision is based on which data processor core is least loaded or has the lowest priority. In a four data processor core system such as illustrated in FIG. 3A, the priority of a new interrupt request is compared against the priority of data processor cores 220, 230, 240 and 250. If the interrupt priority is below the priority of all four data processor cores 220, 230, 240 and 250, HIC 310 stalls the interrupt and holds it pending. If the interrupt priority is higher than the priority of one or more of data processor cores 220, 230, 240 and 250, HIC 310 routes the interrupt to the data processor core with the lowest priority. This ensures optimal use of data processor cores 220, 230, 240 and 250. HIC 310 does not pass an interrupt request to a data processor core until the data processor core can service it. This avoids thrashing and spurious interrupts. As noted above, in the preferred embodiment data processor cores 220, 230, 240 and 250 have no cache memory. Thus there is no cost to running the interrupt on any data processor core. In contrast a typical SMP system may lose a lot of time due to cache snoop and flush/load operations.

Load balanced systems can service systems events far more efficiently, while maintaining real time or even hard real time characteristics. Systems which pre-determine routing suffer when the load is not naturally balanced in time and priority. The load balanced system of this invention frees the system developer from trying to understand both periodicity, overlapping periodicity and load versus time. Modeling the load balancing system of this invention is far easier than the prior art. This model matches the normal modeling of a single data processor core system. Further, rate monotonic (deadline) systems can be constructed safely in most cases. This invention is further advantageous because it works well in systems with very varying loads. When the load is low, only one data processor core is active. This saves power. As the load increases, more data processor cores are automatically added based on rate to completion. Thus data processor cores are highly utilized for minimum power use. This invention is advantageous over running one data processor core very fast or varying its speed. When increasing the speed of a single data processor core past a certain speed, the memory system cannot keep up. Thus this prior art technique would require caches or faster, more power hungry memory.

The preferred embodiment of HIC 310 is a separate module which intercepts interrupts and re-feeds them to a set of interrupt controllers within the data processor cores as illustrated in FIG. 3A. FIG. 3B illustrates a first alternative. FIG. 3B illustrates HIC 311 acting as the only interrupt controller for data processor cores 320, 330, 340 and 350. HIC 311 distributes interrupts among data processor cores 320, 330, 340 and 350 in the same manner as described above for HIC 310. FIG. 3C illustrates yet another alternative. FIG. 3C illustrates interrupt controllers 323, 333, 343 and 353 of respective data processor cores 321, 331, 341 and 351 communicating via lines 327, 337 and 347. Using this communication interrupt controllers 323, 333, 343 and 353 handle the multiplexing of interrupts. This distributes interrupts among data processor cores 321, 331, 341 and 351 in the same manner as described above for HIC 310.

Figure 4:
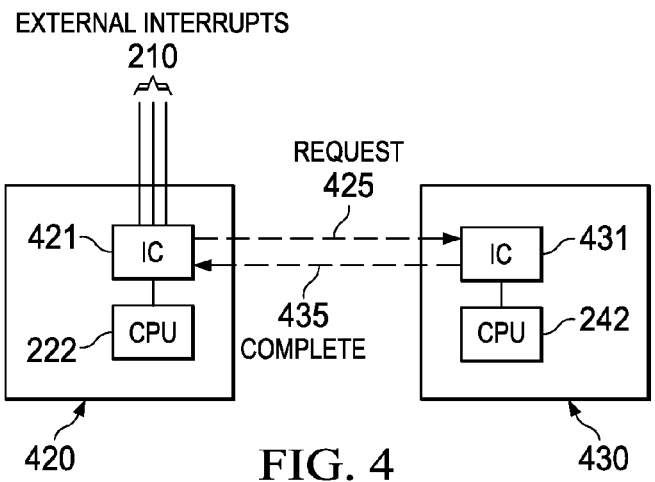
FIG. 4 shows a master slave system with two data processor cores.

FIG. 4 shows a master/slave system with two data processor cores 420 and 430. Master data processor core 420 sends requests to slave data processor core 430 via request line 425. These requests include interrupt requests. Slave data processor core 430 performs the requested data processing and signals completion via completion line 435. This completion corresponds to a return from interrupt operation if slave data processor core 430 is servicing an interrupt. FIG. 4 illustrates only a single slave data processor core but those skilled in the art would realize that plural slave data processor cores are feasible.

The system illustrated in FIG. 4 allows one data processor core of a cluster of four data processor cores, for example, to farm out threads of execution to other data processor cores. Each such receiving data processor core signals completion back to the master data processor core. The interrupt model optimizes this hand off process. Master data processor core 420 signals which thread is transferred to a slave data processor core 430 using the interrupt number. Upon completion of the interrupt, the slave data processor core 430 signals back to master data processor core 420 via an interrupt. Using priorities permits a choice of three use models: master data processor core 420 takes the completion interrupt as higher priority to be able to immediately farm out any next thread; a rendezvous model allows master data processor core 420 to wait for completion of slave threads plus its own thread; and a factory model allows slave data processor core(s) 430 to process data tasks while master data processor core 420 unpacks the incoming data and optionally packs outgoing data. The factory model allows master data processor core 420 to choose whether to de-power slave data processor core(s) 430 and handle the tasks itself based on load. This provides minimum power use.

As in the load balancing model illustrated in FIGS. 3A, 3B and 3C, this master/slave model uses hardware to facilitate task distribution without putting the burden on software or system design. The task model is another variant of interrupt distribution but includes a controlling master data processor core. Using a master data processor core is far more appropriate for certain types of applications such as farming out workload not specifically associated with a hardware event. For example, video decoding often needs to move and process a set of pixel blocks in a pixel block operation that are computationally expensive. By farming out each pixel block, the complete task can be completed faster. A master data processor core is needed to correctly stitch the blocks back together. Likewise for any data that can be partitioned and worked on separately. Integration of the processing of many sensors is another example where the task model is appropriate. The time oriented nature of this processing makes it simpler to split out task processing to slave data processor cores and use the master data processor core to integrate the results. Another example is the routing and treating slave data processor cores as micro-engines.

The preferred embodiment adds a register bit to the interrupt controllers or HIC 310 which marks one data processor core within a cluster as master and the other data processor core(s) as slaves. For each slave data processor core a return from interrupt generates an interrupt back to the master data processor core. The system defines a range of interrupts which are slave interrupts. This return from interrupt behavior only applies to these slave interrupts. Slave interrupts will have a higher priority, either statically or dynamically to ensure that slave requests take precedence over other actions.

Figure 5:
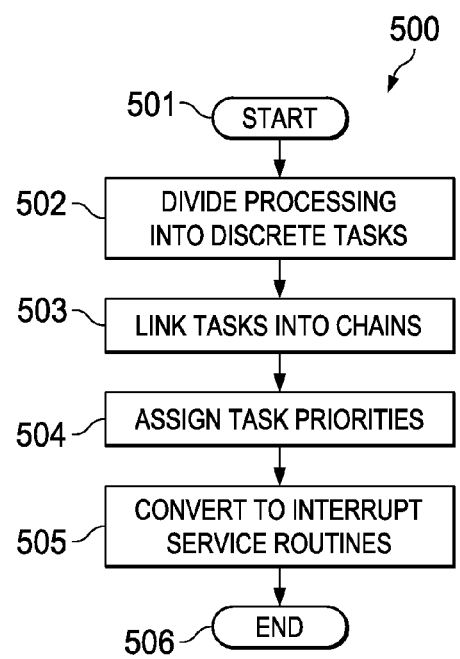
FIG. 5 is a flow chart of the steps of producing a program suitable for performing a known data processing function on a multi-processor system of this invention.

FIG. 5 illustrates flow chart 500 for producing program suitable for performing on a multi-processor system of this invention. It is assumed that the data processing task to be performed by the multi-processor system is known to the same extent that a computer programmer knows the data processing task to be coded for a single data processor system. Flow chart 500 begins at start block 500. Block 502 divides the data processing operation into a number of discrete tasks. This task is similar to that needed in programming a single processor system that typically operates on a time-shared basis. Block 503 links these tasks into chains. The base data processing operation often requires sequential operations. The chains formed in block 503 follows the sequential operations of the base data processing operation. Block 504 assigns priorities to these tasks. This process is similar to that normally performed by a programmer in a single processor, real-time data processing operation. In both cases the programmer must determine the priority of operation among competing tasks. In block 505 these tasks are converted into interrupt service routines suitable for interrupt processing. As an alternative these tasks can be formed into real-time operating system assignable tasks or thread pieces. This process includes intake procedures and hand-off procedures on interrupt completion. If the task must transfer data to a sequential task in a chain, the conversion must account for this data transfer. This data transfer will typically take the form whereby the end of the prior task moves the data to a commonly accessible memory location and the location is noted by passing pointers. The next task in the chain receives the pointers and accesses the designated data. Flow chart 500 ends at end block 506.

Figure 6:
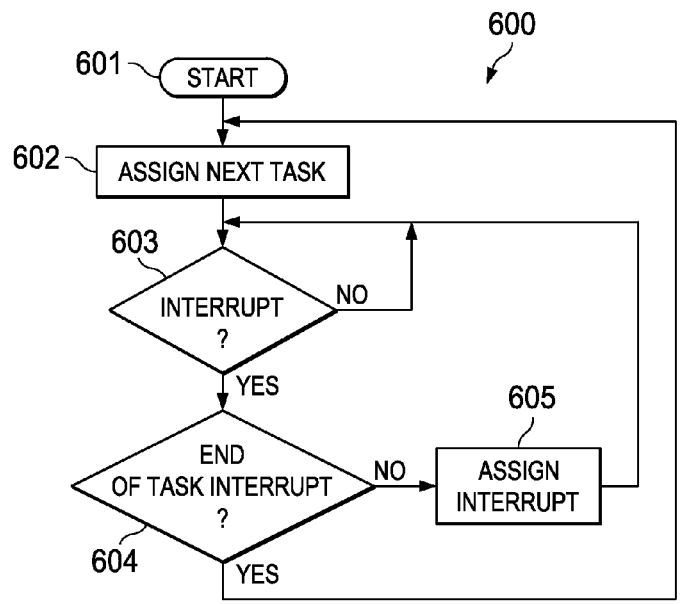
FIG. 6 is a flow chart of the steps of running the program of FIG. 5 on a multi-processor system of this invention.

FIG. 6 illustrates flow chart 600 of a supervisor program controlling the execution of a program produced according to FIG. 5 in a multi-processor system. Flow chart 600 begins with start block 601. Block 602 assigns the next task. Upon initial operation of flow chart 600 the next task is the first task as defined by the chains of block 503 of FIG. 5. As noted in conjunction with FIG. 5 such tasks are implemented as interrupt service routines. At test block 603 the multi-processor system performs currently running tasks while waiting for an interrupt. If no interrupt is received (No at test block 603), flow chart returns to text block 605 to wait for a next interrupt. If an interrupt is received (Yes at test block 603), then flow chart 600 advances to test block 604. Test block 604 determines whether the just received interrupt is an end of task interrupt. Note that completion of a task generally triggers an interrupt. If the just received interrupt is not an end of task interrupt (No at text block 604), then block 605 assigns the interrupt according to the priority rules previously described. Flow chart 600 advances to test block 603 to again wait for an interrupt. If the just received interrupt is an end of task interrupt (Yes at text block 604), then flow chart 600 advances to block 602. Block 602 assigns a next task according to the chains defined by block 503 of FIG. 5. This next task assignment includes triggering the corresponding interrupt and assigning this interrupt.

Figure 7:
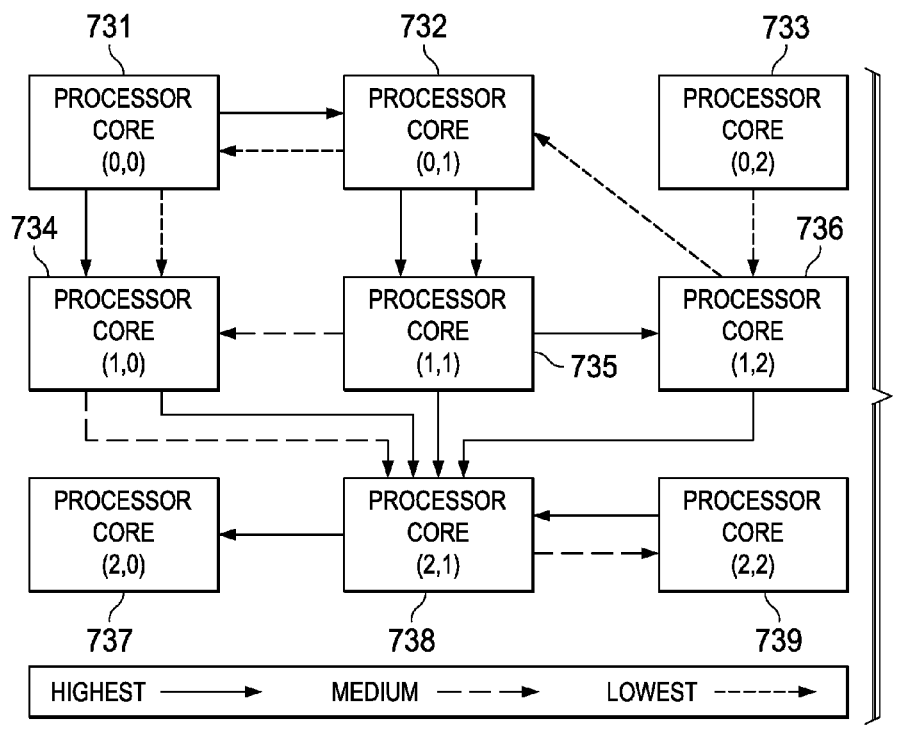
FIG. 7 shows multiple planes of operation based on priority.

FIG. 7 shows multiple planes of operation based on priority according to a program generated according to FIG. 5 and executed according to FIG. 6. Note that FIG. 7 does not try to represent time. FIG. 7 illustrates nine data processor cores 731, 732, 733, 734, 735, 736, 737, 738 and 738 and three priorities. FIG. 7 illustrates a highest priority task passing: from data processor core 731 to data processor cores 732 and 734; from data processor core 732 to data processor core 735; from data processor core 734 to data processor core 738; from data processor core 735 to data processor cores 736 and 738; from data processor core 736 to data processor core 738; from data processor core 739 to data processor core 738; and from data processor core 738 to data processor core 737. FIG. 7 illustrates a medium priority task passing: from data processor core 732 to data processor core 735; from data processor 735 to data processor core 734; from data processor core 734 to data processor core 738; and from data processor core 738 to data processor core 739. FIG. 7 illustrates a lowest priority task passing: from data processor core 733 to data processor core 736; from data processor core 736 to data processor core 732; from data processor core 732 to data processor core 731; and from data processor core 731 to data processor core 734. This is illustrative only and typical systems will have far more priorities and planes. Note that one plane or priority may have multiple waves of processing separated in time, in space (which data processor cores are used) or because load permits.

The prior art has used factory models to optimize stream processing, parallel processing and pipelined processing, this invention uses prioritized interrupts allowing multiple planes of such wave fronts. According to this invention task priority or deadline timing can choose priorities. For example, a static priority model may give highest priority to one stream of data and so the interrupts ensure they immediately process this data stream as it moves through the data processor cores. At the same time lower priority data streams will run otherwise. This priority technique maximizes utilization of the data processor cores. The lower priority processing may have less immediate need, be refinement passes or be trending or other integrate-able data of a more varying nature.

Another example uses deadline based priorities. Deadline based priority pushes priorities up as the deadline gets closer. This can be used with load balancing or master/slave to minimize number of data processor cores employed to optimize power use. Common examples of lower priority processing include housekeeping, heuristics, system-wide processing, maintenance and safety analysis or integrity checking. The system may collect a previous computation data set and rerun it through a different data processor core set to verify correctness via a hardware check or using a stronger and slower algorithm to validate accuracy.

The preferred embodiment requires a proper prioritized interrupt model within each data processor core to prioritize the flow of execution and data. An extended embodiment uses load balancing to route traffic to maximize utilization.

Figure 8:
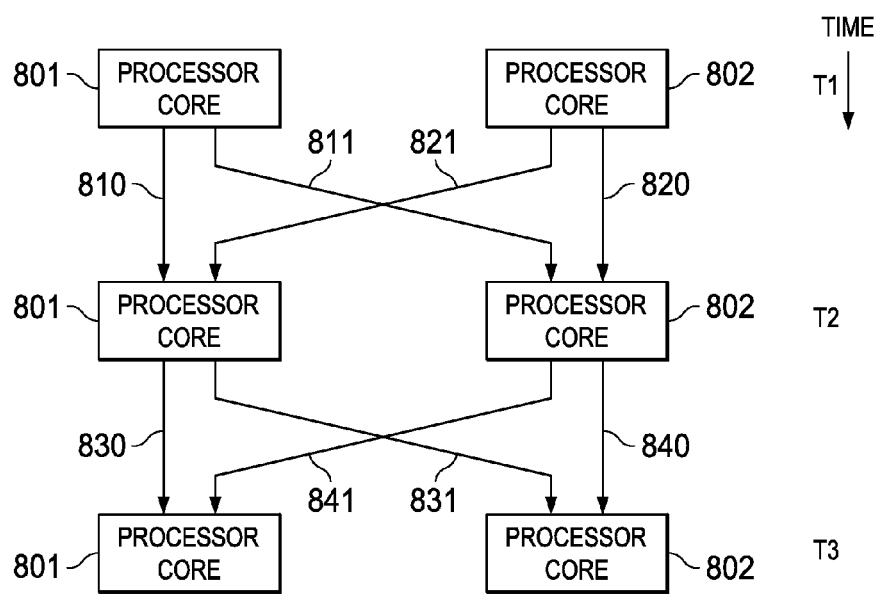
FIG. 8 shows a simple system running the same code in parallel, with cross triggered synchronization to allow verification of common results between data processor cores.

FIG. 8 illustrates a simple system running the same code in parallel, with cross triggered synchronization to allow verification of common results between each data processor core. At time T1, data processor core 801 performs a first part of the task and generates data 810 sent to data processor core 801 at time T2 and data 811 sent to data processor core 802 at time T2. Also at time T1, data processor core 802 performs the first part of the task and generates data 820 sent to data processor core 802 at time T2 and data 821 sent to data processor core 801 at time T2. At time T2, data processor core 801 compares data 810 and 821 while data processor core 802 compares data 820 and 811. Assuming a match at both data processor cores 801 and 802, both data processor cores perform a second part of the task. Data processor core 801 performs the second part of the task and generates data 830 sent to data processor core 801 at time T3 and data 831 sent to data processor core 802 at time T3. Also at time T2, data processor core 802 performs the second part of the task and generates data 840 sent to data processor core 802 at time T3 and data 821 sent to data processor core 801 at time T3. Remedial action is triggered if either data processor core 801 or 802 detects a non-match. A similar compare and continue operation occurs at time T3. More complex systems are also possible where the synchronization is done less or more often and where an arbitration among data processor cores determines whether to proceed. The two parallel operations could use identical software. Such a system may also use different software in different data processor cores because only results have to match.

Two or three parallel paths through a set of data processor cores with check-points using interrupt rendezvous verifies correctness in safety systems. Using interrupts permits the topology to be setup dynamically and even changed over time to ensure maximal chance of detecting problems. An errant data processor core can be removed with the data processing path routed around it. The isolated data processor core could then run self-checks controlled by another data processor core.

What is claimed is:

1. A method of performing a data processing operation on a multi-processor system comprising the steps of:
    dividing the data processing operation into a plurality of discrete tasks;
    linking said tasks in to at least one chain;
    assigning priorities to said tasks;
    converting each of said tasks into an interrupt service routine; and
    performing said interrupt service routines of at least one chain of task in a multi-processor system by responding a received interrupt by assigning a corresponding interrupt service routine to one data processor core of a plurality of data processor cores of the multi-processing system dependent upon respective priority levels of any interrupt service routines operating on said plurality of data processor cores and a priority level of said received interrupt.

2. The method of claim 1, wherein:
    said step of converting each of said tasks into an interrupt service routine includes trigging an end of task interrupt upon completion of said corresponding task; and
    said step of performing said interrupt service routines includes
       assigning each task at a beginning of a chain to one data processor core of said plurality of data processor cores, in response to an end of task interrupt, issuing an interrupt for any sequential task in the corresponding chain.

3. The method of claim 1, wherein:

said step of converting each of said tasks into an interrupt service routine includes converting at least one task into two parallel interrupt service routines and at least one comparison interrupt service routine, said comparison interrupt service routine comparing results of said parallel interrupt service routines to verify correct operation.

4. The method of claim 3, wherein:

said two parallel interrupt service routines are identical.

5. The method of claim 3, wherein:

said two parallel interrupt service routines employ different algorithms.

6. The method of claim 3, wherein:

said step of verifying correct operation notes any data processor core operating incorrectly; and said step of assigning a corresponding interrupt service routine to one data processor core of a plurality of data processor cores does not assign a interrupt service routine to any data processor core noted as operating incorrectly.

* * * * *